United States Patent [19]

Wagner

[11] Patent Number: 4,927,202
[45] Date of Patent: May 22, 1990

[54] CONVERTIBLE TOP VINYL PUSH-OUT

[75] Inventor: Joseph M. Wagner, Manitou Beach, Mich.

[73] Assignee: C & C Incorporated, Brighton, Mich.

[21] Appl. No.: 243,941

[22] Filed: Sep. 12, 1988

[51] Int. Cl.⁵ .............................................. B60J 7/06
[52] U.S. Cl. ..................................... 296/107; 296/127
[58] Field of Search ............... 296/127, 107, 108, 116, 296/128, 129, 130

[56] References Cited

U.S. PATENT DOCUMENTS

| | | | |
|---|---|---|---|
| 2,694,598 | 11/1954 | Ulrich | 296/107 |
| 3,655,238 | 4/1972 | Stewart | 296/107 |
| 3,666,317 | 5/1972 | Podwys | 296/116 |
| 4,660,882 | 4/1987 | Hensiek | 296/104 |

Primary Examiner—Charles A. Marmor
Assistant Examiner—Richard Camby
Attorney, Agent, or Firm—Edgar A. Zarins; Malcolm L. Sutherland

[57] ABSTRACT

An attachment to the support structure of a retractable convertible top for a vehicle which prevents the vinyl top material from becoming caught between the cross support bows of the structure. As a result, the storage stack height of the fully retracted roof is reduced. The invention consists of a pair of push-out attachments which are secured to opposite sides of the support structure directly to the cross bow. The push-outs are mounted to the bow using the existing screws of the structure and replace a cardboard spacer found on the structure. The opposite end of the push-out includes a slot which travels along the side power link. As the top is retracted, the push-out engages the vinyl material which tends to fold along with the structure and prevents the material from becoming caught between the bows. Once the top is fully retracted, the stack height is substantially reduced.

15 Claims, 1 Drawing Sheet

U.S. Patent        May 22, 1990        4,927,202
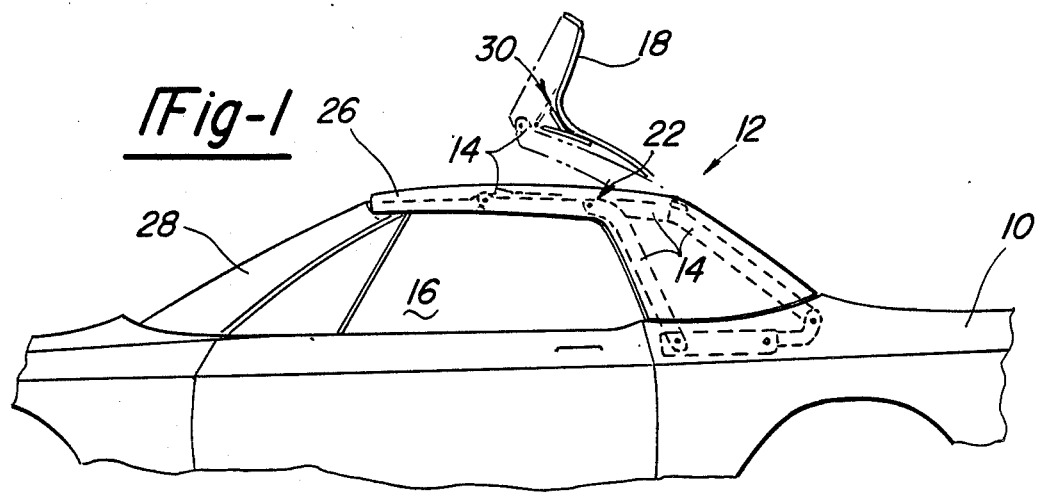
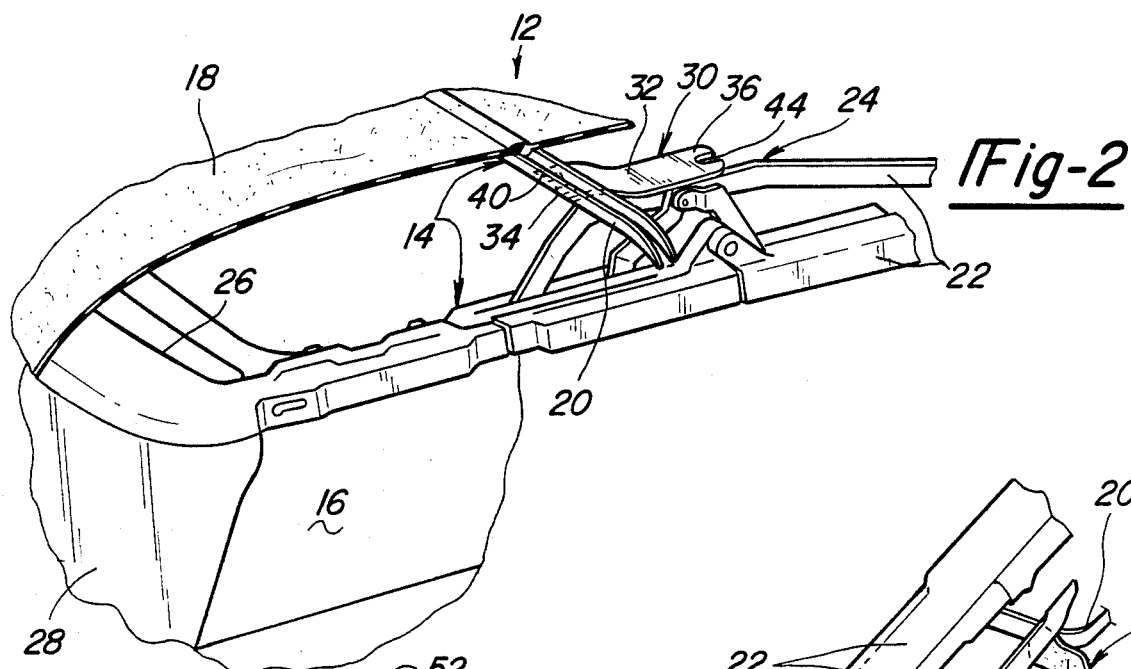
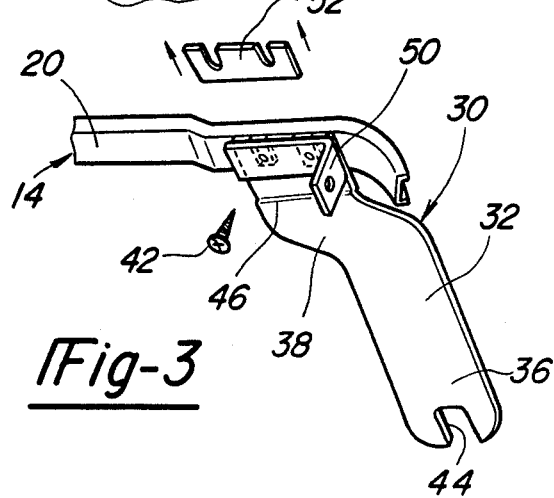
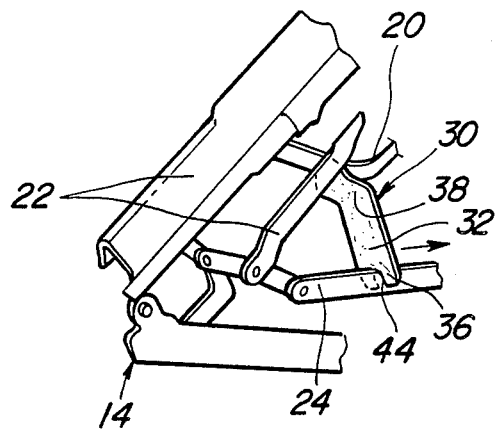

CONVERTIBLE TOP VINYL PUSH-OUT

BACKGROUND OF THE INVENTION

I. Field of the Invention

This invention relates to retractable convertible tops for vehicles and, in particular, to a push-out attachable to the support structure of the top which prevents the vinyl roof material from becoming caught between the cross bows of the structure thereby reducing the final stack height of the fully retracted top.

II. Description of the Art

Retractable vehicle tops are well known for converting a vehicle between an enclosed passenger compartment and an open-air compartment vehicle. Generally, these devices include a vinyl top material attached to a support structure which is collapsible upon itself toward the rear of the passenger compartment. The support structure may include side power links to draw the sections of the structure upon each other. The vinyl top is connected to the header which secures to the top of the vehicle windshield and to a plurality of cross bows which form a portion of the support structure. As the top retracts and collapses, the bows are brought together.

In the prior known automatic convertible tops, as the top was retracted the driver would have to take care that the vinyl material did not become caught or pinched between components of the support structure, most often the converging cross bows. Oftentimes this required someone to manually pull the vinyl top material from between the bows. If the driver was alone this may have required that retraction of the top be stopped while the driver walked around the vehicle to pull the material from between the bows. In the worst case, the material could become pinched within the support structure resulting in a tear of the vinyl top. In any case, the final stack height of the fully retracted top would be too high to facilitate proper storage of the top.

SUMMARY OF THE PRESENT INVENTION

The present invention overcomes the disadvantages of the prior known convertible tops by providing a simple attachment to the cross bow of the support structure which pushes the vinyl material out from between the bows as the top is retracted.

The convertible top vinyl push-out of the present invention embodies a pair of attachments mounted on opposite sides of a cross bow of the support structure. Although typical support structures include a plurality of bows and the push-outs could be attached to each, it has been found that attaching the push-outs to the second bow alone sufficiently prevents the vinyl from being caught within the structure to reduce the stack height. The push-out attachments are substantially planar components made of a bendable plastic. A first end of the attachment includes openings for receiving mounting screws. The attachment is mounted to the cross bow using existing screws which attach a guide member to the bow. The other end of the attachment includes a slot which rides along the side power link as the structure is retracted. Thus, the attachment forms a diagonal between the converging support structure sections forcing the pad and vinyl out of the way.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 1 is an elevated perspective of a vehicle with a retractable convertible top embodying the vinyl push-out attachment of the present invention;

FIG. 2 is a cut-away view of the convertible top in the closed position with one of the push-out attachments of the present invention mounted to the support structure of the top;

FIG. 3 is an elevated perspective of one of the push-out attachments mounted to the cross bow of the top support structure; and FIG. 4 is an enlarged perspective of one of the push-out attachments secured to the partially retracted top structure.

DETAILED DESCRIPTION OF A PREFERRED EMBODIMENT OF THE PRESENT INVENTION

Referring first to FIG. 1, there is shown a vehicle 10 with a retractable convertible top 12 embodying the present invention. The convertible top 12 is of a well known construction and includes a retractable support structure 14 for movement of the top 12 between an extended position enclosing the passenger compartment 16 of the vehicle 10 and a stored position wherein the top 12 is retracted to the rear of the passenger compartment 16. Typically, the passenger compartment 16 includes a rear well which receives the top 12 for storage. Attached to the support structure 14 is a covering material 18 to keep the elements from the passenger compartment 16. The covering material 18 typically includes a vinyl material and an associated insulative pad. The support structures 14 of the well known retractable convertible tops 12 include at least one cross bow 20 which extend between side rail components 22 which includes the power link 24 to extend and retract the top 12. A header 26 is also provided for securing the top 12 to the upper end of the windshield 28. The support structure 14 for the convertible top 12 may include a variable number of cooperating components and the structure herein is provided as an example to facilitate description of the present invention.

Referring now to FIGS. 2 through 4, the present invention embodies an attachment 30 to the support structure 14 of the convertible top 12 which prevents the covering material 18 from becoming caught between components of the support structure 14 as the top is retracted to its stored position. The attachment 30 preferably includes a pair of members secured to opposite sides of the support structure 14. The attachments 30 are substantially identical in configuration although mirror-images of each other such that a right and a left attachment are provided for the convertible top 12. In a preferred embodiment, the attachments 30 are secured to the cross bow 20 nearest the header 26 although it is contemplated that the attachments 30 could be used on the remaining cross bows. Furthermore, the attachments 30 are secured near the outboard ends of the cross bow 20 proximate the side rail components 22 as shown in FIG. 2.

The attachment 30 has a substantially planar elongated body 32 with a first end 34 and a second end 36. In a preferred embodiment, the attachment 30 is made out of plastic with a thickness between 0.05 and 0.1 inches. The body 32 includes a redirecting lateral bend 38 such that the first end 34 can be secured to the cross bow 20 while the second end 36 engages the side rail components 22. The first end 34 includes a pair of slotted openings 40 for receiving screws 42 to secure the attachment 30 to the cross bow 20. The second end 36 includes a slot 44 adapted to receive a component of the side rail, preferably a member of the power link 24 as shown in FIG. 4. The slot 44 will travel along the power link 24 during retraction of the top 12 as will be subsequently described. The body 32 of the attachment 30 also includes a transverse groove 46 which will allow the attachment 30 to bend during operation of the top 12.

As best shown in FIG. 3, the attachment 30 is secured to the cross bow 20 using the existing hardware of the support structure 14. The cross bow 20 is provided with a guide flange 50 which is attached to the cross bow 20 using screws 42. A cardboard spacer 52 is typically provided between the guide flange 50 and the cross bow 20. Following removal of the screws 42, the first end 34 of the attachment 30 is positioned in place of the spacer 52 between the guide flange 50 and the cross bow 20. The screws 42 are utilized to secure the first end 34 of the attachment 30. In this position, the slot 44 of the second end 36 will be positioned over the power link 24 for travel therealong during retraction and extension of the top 12. One attachment 30 is secured to each end of the cross bow 20.

Operation of the retraction mechanism of the top 12 with the attachments 30 secured as described will prevent the covering material 18 from becoming caught within the power link 24, between side components 22 or between the cross bows 20 of the top support structure 14 as the top 12 is retracted towards its stored position. As a result, the user is free to operate the top 12 without interruption for adjustment of the covering material 18 and the final stack height of the fully retracted top 12 is reduced. As the retraction mechanism is engaged, the top 12 will fold on top of itself section by section. As the top retracts, the slot 44 will travel along the power link 24. The vinyl covering material 18 will be prevented from folding inwardly between the cross bows and the linkage components by the attachment 30 as it travels along the power link 24. Upon extension of the top 12 to enclose the passenger compartment 16, the attachments 20 will lie flat against the top of the power link 24. Thus, the present invention provides a simple device for allowing smooth operation of the top 12 while also ensuring a reduced stack height.

The foregoing detailed description has been given for clearness of understanding only and no unnecessary limitations should be understood therefrom as some modifications will be obvious to those skilled in the art without departing from the scope and spirit of the appended claims.

I claim:

1. An attachment to a retractable convertible top for a vehicle, the convertible top including a retractable support structure and a covering material attached to the support structure, said attachment comprising:
a main body having first and second ends, said first end fixedly attached to the support structure of the top and said second end slidably engaging the support structure of the top for movement therealong during retraction and extension of the top, said body engaging the covering material of the top during retraction preventing the covering material from becoming caught between components of the support structure.

2. The attachment as defined in claim 1 wherein said second end of said main body includes a slot, said slot receiving a side rail component of the support structure, said slot travelling along the rail component during retraction of the top.

3. The attachment as defined in claim 2 wherein said first end of said main body includes at least one opening for securing said attachment to the support structure, said at least one opening receiving screw means for securing said attachment to a cross bow of the support structure.

4. The attachment as defined in claim 3 wherein a pair of said attachments are secured to the support structure of the vehicle top, said attachments secured to the outboard ends of a cross bow of the support structure and engageable with the respective side rail component of the support structure.

5. The attachment as defined in claim 4 wherein said main body has an elongated planar configuration, said main body made of a plastic material.

6. The attachment as defined in claim 5 wherein said main body has a transverse groove, said main body bendable along said groove.

7. An attachment to a retractable convertible top for a vehicle, the convertible top including a covering material mounted to a retractable support structure having retractable side rail components and at least one cross bow, said attachment comprising:
a main body having first and second ends, said first end attached to a cross bow of the support structure and said second end engaging the side rail of the support structure, said body engaging the covering material during retraction of the vehicle top such that the covering material is prevented by said attachment from becoming caught between components of the support structure of the convertible vehicle top.

8. The attachment as defined in claim 7 wherein a pair of said main bodies are secured to opposite ends of the at least one cross bow and engageable with the corresponding side rail components.

9. The attachment as defined in claim 8 wherein said main body has an elongated planar configuration, said main body including a transverse groove.

10. The attachment as defined in claim 9 wherein said second end of said main body includes a slot for receiving the side rail of the support structure, said slot travelling along the side rail during retraction of the vehicle top.

11. The attachment as defined in claim 10 wherein said first end of said main body includes a pair of slotted openings, said slotted openings receiving screw means of the support structure for securing said first end to the cross bow of the vehicle top.

12. In a convertible top for a vehicle movable between an enclosing position on the vehicle and a retracted position exposing the passenger compartment of the vehicle, the convertible top including a covering material mounted to a retractable support structure, the support structure including side rail components extending along the sides of the top and at least one cross bow extending laterally between the side rail components of the top, the improvement comprising:

a pair of attachments secured to the support structure of the convertible top, said attachments including a first end secured to the cross bow and a second end engageable with the side rail components of the top, said attachments engaging the covering material during retraction of the top to prevent the covering material from becoming caught between components of the support structure thereby reducing the storage stack height of the fully retracted convertible top.

13. The improved convertible top as defined in claim 12 wherein said second end of said attachments include a slot for receiving the side rail components of the top, said slot of said second end travelling along the side rail components during retraction of the top.

14. The improved convertible top as defined in claim 12 wherein said first end of said attachments are secured to the cross bow using existing screw means on the cross bow.

15. The improved convertible top as defined in claim 13 wherein said attachments are secured to opposite ends of the cross bow proximate the side rail components.

* * * * *